United States Patent
Rabie et al.

(10) Patent No.: US 12,553,316 B2
(45) Date of Patent: Feb. 17, 2026

(54) CORROSION INHIBITOR COMPOSITIONS FOR REDUCING CORROSION, AND RELATED METHODS OF OPERATING A WELLBORE

(71) Applicant: Schlumberger Technology Corporation, Sugar Land, TX (US)

(72) Inventors: Ahmed Rabie, Sugar Land, TX (US); Rasika Prabhu, Sugar Land, TX (US); Christopher Daeffler, Sugar Land, TX (US); Juan David Estrada Benavides, Katy, TX (US); Robert Brown, Houston, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 18/782,974

(22) Filed: Jul. 24, 2024

(65) Prior Publication Data

US 2025/0075595 A1 Mar. 6, 2025

Related U.S. Application Data

(60) Provisional application No. 63/582,271, filed on Sep. 13, 2023, provisional application No. 63/579,707, filed on Aug. 30, 2023.

(51) Int. Cl.
*E21B 43/267* (2006.01)
*C09K 8/54* (2006.01)
(Continued)

(52) U.S. Cl.
CPC ............... *E21B 41/02* (2013.01); *C09K 8/54* (2013.01); *E21B 43/267* (2013.01); *C09K 8/80* (2013.01); *C09K 2208/32* (2013.01)

(58) Field of Classification Search
CPC ......... E21B 41/02; E21B 43/267; C09K 8/54; C09K 8/80
See application file for complete search history.

(56) References Cited

U.S. PATENT DOCUMENTS

| | | | | |
|---|---|---|---|---|
| 4,655,852 A | * | 4/1987 | Rallis | C23C 14/16 427/398.1 |
| 5,096,618 A | * | 3/1992 | Frenier | C23F 11/10 507/263 |

(Continued)

OTHER PUBLICATIONS

Search Report and Written Opinion of International Patent Application No. PCT/US2024/040544 dated Nov. 21, 2024, 11 pages.

*Primary Examiner* — Silvana C Runyan
(74) *Attorney, Agent, or Firm* — Jeffrey D. Frantz

(57) ABSTRACT

A method of reducing corrosion within a wellbore includes placing a wireline including a perforating gun in a wellbore, the wellbore extending through an earth formation and including a casing extending through the earth formation, the wireline including zinc, discharging the perforating gun to form perforations through the casing and in the earth formation surrounding the casing proximate the at least one perforating gun, flowing a fracturing fluid including one or more proppants through the perforations and into the earth formation to open fractures in the earth formation with the one or more proppants, introducing a flushing fluid into the wellbore to displace the fracturing fluid, and flowing a corrosion inhibitor composition into the wellbore and through the perforations with at least one of the fracturing fluid and the flushing fluid. The corrosion inhibitor includes an alkenylphenone, and a substituted 1-azanapthalene.

10 Claims, 8 Drawing Sheets

(51) Int. Cl.
*E21B 41/02* (2006.01)
*C09K 8/80* (2006.01)

(56) References Cited

U.S. PATENT DOCUMENTS

| | | |
|---|---|---|
| 10,280,362 B2 | 5/2019 | Purdy |
| 10,329,476 B2 | 6/2019 | Purdy |
| 10,590,336 B2 | 3/2020 | Purdy |
| 10,753,001 B2 | 8/2020 | Purdy |
| 10,822,535 B2 | 11/2020 | Purdy et al. |
| 10,947,123 B2 | 3/2021 | Purdy |
| 10,982,133 B2 | 4/2021 | Purdy |
| 11,098,241 B2 | 8/2021 | Purdy |
| 11,168,246 B2 | 11/2021 | Purdy |
| 11,248,166 B2 | 2/2022 | Purdy |
| 11,293,106 B2 | 4/2022 | Purdy |
| 11,319,479 B2 | 5/2022 | Purdy |
| 11,370,961 B2 | 6/2022 | Purdy |
| 11,447,692 B2 | 9/2022 | Purdy |
| 2005/0130849 A1 | 6/2005 | Patel |
| 2009/0114392 A1* | 5/2009 | Tolman ................... E21B 43/25 166/305.1 |
| 2017/0342307 A1 | 11/2017 | Vasquez |
| 2017/0350222 A1 | 12/2017 | Gullickson |
| 2019/0345807 A1 | 11/2019 | Purdy |
| 2020/0024508 A1* | 1/2020 | Xu ......................... E21B 37/06 |
| 2020/0263080 A1 | 8/2020 | Purdy |
| 2020/0291287 A1 | 9/2020 | Purdy |
| 2020/0317516 A1 | 10/2020 | Purdy |
| 2020/0318009 A1 | 10/2020 | Purdy |
| 2021/0024814 A1 | 1/2021 | Schipper |
| 2021/0189226 A1 | 6/2021 | Purdy |
| 2021/0189855 A1* | 6/2021 | Purdy ................... C09K 8/602 |
| 2021/0198561 A1 | 7/2021 | Purdy |
| 2021/0230476 A1 | 7/2021 | Purdy |
| 2021/0388265 A1 | 12/2021 | Purdy |
| 2022/0049156 A1 | 2/2022 | Purdy |
| 2022/0089938 A1 | 3/2022 | Purdy |
| 2022/0243146 A1 | 8/2022 | Purdy |
| 2022/0267178 A1 | 8/2022 | Purdy |
| 2023/0018020 A1* | 1/2023 | Geddes ..................... C23C 2/38 |

* cited by examiner

CORROSION INHIBITOR COMPOSITIONS FOR REDUCING CORROSION, AND RELATED METHODS OF OPERATING A WELLBORE

CROSS REFERENCE TO RELATED APPLICATIONS

This application claims priority to and the benefit of U.S. Provisional Patent Application No. 63/579,707, filed Aug. 30, 2023, entitled "TECHNIQUES FOR MINIMIZING CORROSION IN THE PRESENCE OF AN ACID USING A CORROSION INHIBITOR," and U.S. Provisional Patent Application No. 63/582,271, filed Sep. 13, 2023, entitled "TECHNIQUES FOR MINIMIZING CORROSION IN THE PRESENCE OF AN ACID USING A CORROSION INHIBITOR," the disclosure of each of which applications is incorporated herein by reference in its entirety.

BACKGROUND

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as an admission of any kind.

After drilling a wellbore through an earth formation, the wellbore is completed to connect hydrocarbon reservoirs within the earth formation to the surface to facilitate fluids to be produced from or injected into the wellbore and earth formation. For example, wellbore completion includes providing a conduit for well stimulation treatments, such as acidizing and perforating. Perforation of the wellbore creates perforation tunnels, which facilitate fracturing of the earth formation to create fractures through which formation fluids may be produced. After perforation, acid cleaning of the perforation tunnels may be conducted with an acid composition. Since the acid composition is corrosive to wellbore equipment, conventionally casing strings are tripped from the wellbore prior to the acid cleaning.

BRIEF SUMMARY

In some embodiments, a method of operating a wellbore includes placing a wireline including a perforating gun in a wellbore, the wellbore extending through an earth formation and including a casing extending through the earth formation, the wireline including zinc, discharging the perforating gun to form perforations through the casing and in the earth formation surrounding the casing proximate the at least one perforating gun, flowing a fracturing fluid including one or more proppants through the perforations and into the earth formation to open fractures in the earth formation with the one or more proppants, introducing a flushing fluid into the wellbore to displace the fracturing fluid, and flowing a corrosion inhibitor composition into the wellbore and through the perforations at least one of before the fracturing fluid, with the fracturing fluid, or with the flushing fluid. The corrosion inhibitor includes an alkenylphenone, and a substituted 1-azanaphthalene.

In some embodiments, a method for inhibiting corrosion of a component comprising zinc, copper, aluminum, nickel, chromium, alloys thereof, or a combination thereof in the presence of an acid includes providing an acid composition in contact with a surface of the component. The corrosion inhibitor composition includes an alkenylphenone and a substituted 1-azanaphtalene.

In some embodiments, a method for inhibiting corrosion of a component comprising one or more of zinc, copper, aluminum, nickel, or chromium, or alloys thereof includes contacting a surface of the component, with a corrosion inhibitor composition comprising an alkenylphenone, a substituted 1-azanaphtalene, and a surfactant including a quaternary ammonium salt. The corrosion inhibitor composition includes at least about 3.0 parts by weight of the substituted 1-azanaphtalene for every about 1.0 part by weight of the alkenylphenone.

Certain embodiments of the present disclosure include a method for inhibiting corrosion of a component that includes zinc, copper, aluminum, or chromium, or alloys thereof, or a combination thereof, in the presence of an acid. The method includes providing an acid composition in contact with a surface of the component. The acid composition includes a corrosion inhibitor that includes an alkenylphenone with the structure:

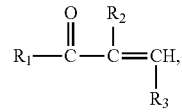

wherein $R_1$ may be unsubstituted or inertly substituted aryl of 6 to about 10 carbons, and $R_2$ and $R_3$ may be the same or different and each may be hydrogen, halogen, or inertly substituted aliphatic of about 3 to about 12 unsubstituted or inertly substituted aryl of 6 to about 10 carbons, provided that the total number of carbons in said alkenylphenone does not exceed 16, and a substituted 1-azanaphtalene of the structure:

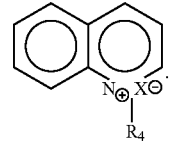

This summary is provided to introduce a selection of concepts that are further described below in the detailed description. This summary is not intended to identify key or essential features of the claimed subject matter, nor is it intended to be used as an aid in limiting the scope of the claimed subject matter.

Additional features and advantages of embodiments of the disclosure will be set forth in the description which follows, and in part will be obvious from the description, or may be learned by the practice of such embodiments. The features and advantages of such embodiments may be realized and obtained by means of the instruments and combinations particularly pointed out in the appended claims. These and other features will become more fully apparent from the following description and appended claims, or may be learned by the practice of such embodiments as set forth hereinafter.

BRIEF DESCRIPTION OF DRAWINGS

In order to describe the manner in which the above-recited and other features of the disclosure can be obtained, a more particular description will be rendered by reference to specific implementations thereof which are illustrated in the appended drawings. For better understanding, the like elements have been designated by like reference numbers throughout the various accompanying figures. While some of the drawings may be schematic or exaggerated representations of concepts, at least some of the drawings may be drawn to scale. Understanding that the drawings depict some example implementations, the implementations will be described and explained with additional specificity and detail through the use of the accompanying drawings in which.

DETAILED DESCRIPTION

Figure 1:
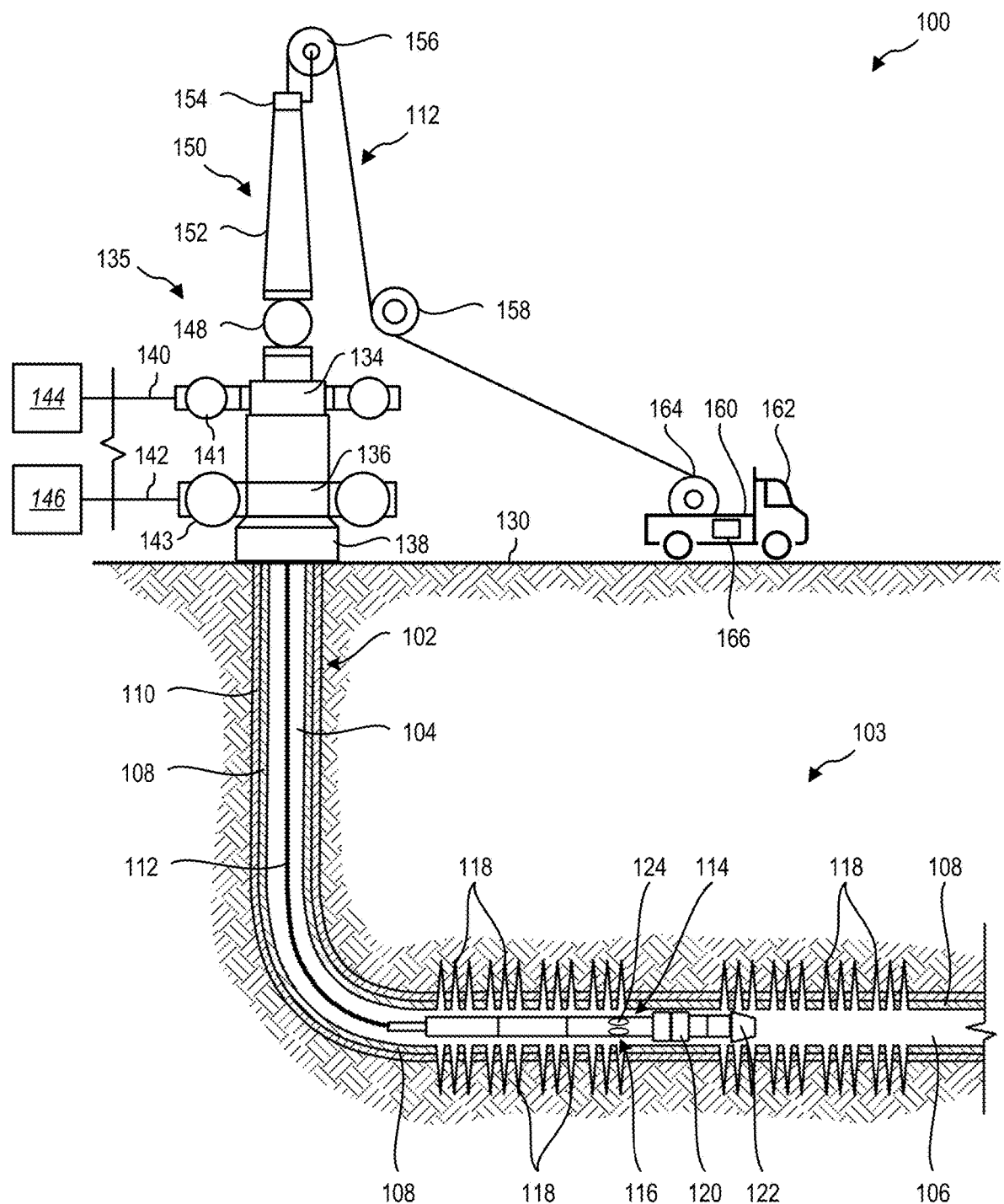
FIG. 1 is a representation of a perforation system for forming perforations in a wellbore and earth formation through which the wellbore extends, according to at least one embodiment of the present disclosure.

This disclosure generally relates to methods of reducing corrosion and to corrosion inhibitor compositions including a corrosion inhibitor for reducing and/or preventing corrosion to one or more components of a wellbore including, for example, wellbore equipment, surface piping, surface equipment, or other equipment or piping associated with a wellbore. The wellbore may be at a stage prior to completion, such as during stimulation and completion operations, or may be a completed wellbore, such as a wellbore that is producing hydrocarbons. The corrosion inhibitor composition may reduce and/or prevent corrosion of, for example, wellbore equipment, casing, production tubing, surface piping, fracturing pumps, valves, a wellhead, or other wellbore equipment or piping.

The corrosion inhibitor composition may be formulated and configured to form a protective layer on components within the wellbore, such as on wellbore equipment and piping. The corrosion inhibitor composition reduce and/or prevent corrosion of components including one or more of zinc, copper, aluminum, nickel, chromium, another metal, alloys thereof, or a combination thereof.

Perforation operations include creating perforation tunnels in a casing, cement, and into the earth formation. However, perforation operations may leave residual cement and formation materials that obstruct the perforations. An acid fluid (e.g., an acid stimulation fluid) may be provided to the wellbore and formulated and configured to dissolve and/or remove residual cement or formation materials from the wellbore after perforation operations. With a compatible acid fluid, perforation of the wellbore to create the perforation tunnels and acid cleaning of the perforation tunnels may be conducted in the wellbore in one stage. However, such techniques may expose wireline cable used in pumpdown operations to the acid of the acid fluid. After repeated usage, the wireline cable may experience mechanical failure due to corrosion. For instance, various portions of the wireline cable may be galvanized, and, thus, susceptible to acid corrosion. Thus, it is desirable to provide a fluid system that minimizes corrosion to such components in order to extend the lifetime of the wireline cable.

In some embodiments, the acid fluid is provided to the wellbore with a corrosion inhibitor composition. The corrosion inhibitor composition may be provided to the wellbore after a stage of the wellbore has been perforated. In some embodiments, the wireline including a perforating gun may remain in the wellbore when the wellbore is exposed to the acid composition including the corrosion inhibitor composition. Accordingly, the corrosion inhibitor composition may facilitate the perforation of a wellbore to create perforation tunnels and acid cleaning of the perforation tunnels in one stage. The corrosion inhibitor composition may reduce and/or prevent corrosion of the wireline cable used in pumpdown operations. The corrosion inhibitor composition protects the wireline and other wellbore equipment from corrosion during acid stimulation. In addition, the corrosion inhibitor composition may protect the wellbore and wellbore equipment during acid washing operations.

In addition to protecting a wireline cable during perforation operations, the corrosion inhibitor composition may be provided to a component of wellbore equipment or piping associated with a wellbore. The corrosion inhibitor composition may be provided to the component with one or more fluids. In some embodiments, the corrosion inhibitor composition is provided with a fracturing fluid or with a flushing fluid provided after a fracturing operation. The corrosion inhibitor composition may be provided with an acid stimulation fluid during a well intervention operation to reduce and/or prevent corrosion of wellbore equipment and piping associated with a producing wellbore. In some such embodiments, the corrosion inhibitor composition may form a part of an acid stimulation fluid and may be provided to the producing wellbore. The corrosion inhibitor composition facilitates intervention of the wellbore with an acid stimulation fluid without removing the production equipment, such as the production tubing, the pump jack, or the associate surface piping from the wellbore. In other embodiments, the corrosion inhibitor composition is provided with an acid during the cleaning or descaling of surface piping.

Accordingly, various embodiments of the present disclosure provide techniques for minimizing the corrosion of a component that contains one or more types of metals and/or metallic alloys. In particular, the techniques provide a fluid system that includes a corrosion inhibitor composition for inhibiting or minimizing the corrosion of such components. For example, the component may include zinc, nickel, copper, chromium, aluminum, iron, one or more alloys thereof, or a combination thereof.

In certain embodiments, the corrosion inhibitor is used in an acidic solution for protecting wireline tools during spearhead acid operations. In certain embodiments, the composition of the corrosion inhibitor may include an alkenylphenone and a substituted 1-azanaphthalene. The alkenylphenone may have the following structure:

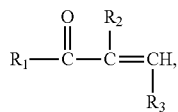

wherein $R_1$ may be an unsubstituted or an inertly substituted aryl having 6 carbon atoms to about 10 carbon atoms, and $R_2$ and $R_3$ may each individually include a hydrogen atom, a halogen, or an inertly substituted aliphatic of about 3 carbon atoms to about 12 carbon atoms, an unsubstituted or an inertly substituted aryl having 6 carbon atoms to about 10 carbon atoms, provided that the total number of carbon atoms in said alkenylphenone does not exceed 16. $R_2$ and $R_3$ may be the same as one another or may be different than one another. The substituted 1-azanaphtalene may have the following structure:

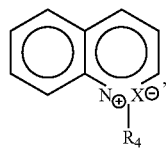

wherein $R_4$ is an unsubstituted or an inertly substituted alkyl having 4 carbon atoms to 16 carbon atoms, or an unsubstituted or inertly substituted alkylaryl having 7 carbon atoms to 20 carbon atoms, and X is a halide.

In certain embodiments, the acidic solution (e.g., the spearhead fluid) may include up to 35% hydrochloric acid (HCl) and have a downhole temperature up to 250 degrees Fahrenheit (° F.). In some embodiments, for example, the acid solution may include up to 15% HCl, up to 7.5% HCl, or any other suitable percentage of HCl.

In certain embodiments, the acidic solution includes up to 3% corrosion inhibitor, up to 1.5% corrosion inhibitor, or up to 1% corrosion inhibitor.

In certain embodiments, the corrosion inhibitor may include other surfactants to increase efficiency or add stability to the formulation. For example, such surfactants that can include quaternary ammonium salts, such as cetyl trimethyl ammonium bromide (CTAB).

FIG. 1 is a representation of a perforation system 100 for forming perforations in a wellbore 102 and earth formation 103 through which the wellbore 102 extends, according to at least one embodiment of the present disclosure. The wellbore 102 may include a vertical portion 104 and a horizontally-extending or deviated portion 106. The wellbore 102 may have been previously formed by one or more drilling operations, followed by casing the wellbore 102 with casing 108. In some embodiments, the casing 108 or at least a portion of the casing 108 may be cemented with cement 110.

The perforation system 100 may include a wireline 112 carrying a bottomhole assembly 114, which may include a perforating gun 116 configured to form one or more perforations 118 through the casing 108, the cement 110 (if present proximate the perforating gun), and at least a portion of the earth formation 103. The bottomhole assembly 114 may further include a plug setting tool 120 configured to place a plug 122 in the wellbore 102 to seal a lower section of the wellbore 102 prior to performing a fracturing operation.

The perforating gun 116 may be configured to fire shaped charges into the casing 108 at desired locations to penetrate the casing 108, the surrounding cement 110, and portions of the earth formation 103 surrounding the perforating gun 116. The perforating gun may include one or more spaced perforations 124 through which the shaped charges are discharged into the casing 108.

The wellbore 102 and the earth formation 103 may be perforated in stages (sections). In some embodiments, after perforating a stage of the wellbore 102 and the earth formation 103, a plug 122 (e.g., a frac plug) may be placed in the casing 108 uphole of perforations 118 to isolate the previously perforated stage from the next stage to be perforated. The frac plug may be configured to block the flow of fracturing fluids of the next stage so that the fracturing fluids are forced through the new perforations. The setting tool 120 may be configured to place the plug 122 in the wellbore 102 to seal a lower section of the wellbore 102 during future fracturing operations. Once activated, the setting tool 120 causes the plug 122 to expand and forces the plug 122 against the inside of the casing 108 to form a seal.

At a surface 130, the wellbore 102 may be capped by a plurality (e.g., a stack) of fluid flow control system 135, such as a so-called "Christmas tree" or a "frac tree." The fluid flow control system 135 may include flow control valves (e.g., master valves, wing valves, swab valves, etc.), spools, flow crosses (e.g., goat heads, frac heads, etc.), and fittings individually and/or collectively configured to direct and control (e.g., permit and prevent) flow of the treatment fluid into the wellbore 102 and to direct and control flow of formation fluids out of the wellbore 102. For example, the fluid flow control system 135 may include at least a first flow control device 134 and a second flow control device 136. The first flow control device 134 and the second flow control device 136 may individually include a valve. The first flow control device 134 and the second flow control device 136 may be configured to close selected tubulars or pipes, such as the casing 108 or production tubing extending within the wellbore 102, to selectively facilitate the flow of various fluids to or from the wellbore 102. In some embodiments, the fluid flow control system 135 includes a blow-out preventer (BOP) stack configured to selectively prevent the flow of formation fluids out of the wellbore 102. The fluid flow control system 135 may be directly or indirectly coupled to the top of a wellhead 138 (e.g., tubing head adapter) terminating the wellbore 102 at the surface 130.

In some embodiments, the first flow control device 134 is operably coupled to and in fluid communication with a first fluid conduit 140 to facilitate selective fluid connection between a first fluid and the wellbore 102. For example, the first flow control device 134 may be in fluid communication with the first fluid conduit 140 via a first valve 141. In some embodiments, the first flow control device 134 is configured to be in fluid communication with one or more of a pump-down fluid, an acid (e.g., a spearhead treatment), a stimulation fluid, a completion fluid, a fracturing fluid, a corrosion inhibitor composition, another fluid to be provided to the wellbore 102, or combinations thereof. In some embodiments, the first fluid includes a pumpdown fluid. In some embodiments, the first fluid includes a fracturing fluid and a corrosion inhibitor composition.

The second flow control device 136 may be operably coupled to and in fluid communication with second fluid conduit 142 to facilitate selective fluid connection between a second fluid and the wellbore 102. For example, the second flow control device 136 may be in fluid communication with the second fluid conduit 142 via a second valve 143. The second fluid may include, for example, one or more of a pumpdown fluid, an acid, a stimulation fluid, a completion fluid, a fracturing fluid, a corrosion inhibitor composition, another fluid to be provided to the wellbore 102, or combinations thereof.

In some embodiments, the wellbore 102 is part of a system including a plurality of wellbores extending through the earth formation 103. For example, a wellsite may include two, three, four, five, six, or more wellbores 102 extending through the earth formation 103. Each of the wellbores 102 of the wellsite may be substantially similar to the wellbore 102 described and illustrated with reference to FIG. 1.

With continued reference to FIG. 1, the first flow control device 134 and the first fluid conduit 140 may be in fluid communication with a first pump 144; and the second flow control device 136 and the second fluid conduit 142 may be in fluid communication with a second pump 146. The first pump 144 and the second pump 146 may be configured to provide a flow of a desired fluid to the wellbore 102.

In some embodiments, the flow control system 135 includes an access valve 148 to facilitate vertical access to the wellbore 102 by, for example, the bottomhole assembly 114 or a tool string. The bottomhole assembly 114 may be conveyed through the wellbore 102 via the wireline 112 which extends through a sealing and alignment assembly 150 operably coupled to the access valve 148 and configured to seal the wireline 112 during deployment, conveyance, intervention, and other wellsite operations performed while the wireline 112 is within the wellbore 102. The sealing and alignment assembly 150 may include a lock chamber 152 (e.g., a lubricator, an airlock, a riser) mounted above access valve 148, a stuffing box 154 configured to seal around the wireline 112 at the top of the lock chamber 152, and a pulley 156 configured to guide the wireline 112 into the stuffing box 154. In some embodiments, a guide pulley 158 guides the wireline 112 between the pulley 156 and a conveyance device 160, such as a winch conveyance device. In some embodiments, the stuffing box 154 is configured to seal around an outer surface of the wireline 112, such as via annular packings applied around the surface of the wireline 112 and/or by injecting a fluid between the outer surface of the wireline 112 and an inner wall of the stuffing box 154. The wireline 112 may be provided from a drum 164 carried by a vehicle 162 that also carries the conveyance device 160. The drum 164 may be rotated by an actuator 166 operably coupled to the drum 164. The actuator 166 may include an electric motor, a hydraulic motor, or another means for selectively unwinding and winding the wireline 112 around the drum 164 and applying an adjustable tensile force to the wireline 112.

The wireline 112 may include one or more electrical cables configured to transmit data and signals to the bottomhole assembly 114, such as to the setting tool 120 and the perforating gun 116. The use of the wireline 112 for performing perforation operations may increase the efficiency of perforation operations. The wireline 112 may facilitate real-time depth control of the perforating gun 116 and the bottomhole assembly 114.

In some embodiments, the wireline 112 includes a protective sheath (or jacket) disposed around internal portions thereof. For example, the protective sheath may be disposed around an armored cable. The wireline 112 may include a steel wire armored cable (SWA). The protective sheath may be formed of and include a fluid-resistant epoxy material. However, due to wear and tear, the protective sheath may become worn, exposing the metals within the protective sheath to the fluids within the wellbore 102. The armored cable may include a zinc galvanization layer, which may be susceptible to corrosion responsive to exposure to various acids that may be present in wellbore fluids that the wireline 112 may be exposed to within the wellbore 102.

In use and operation, the wireline 112 including the bottomhole assembly 114 may be placed (e.g., lowered) into a desired section of the wellbore 102. When the perforating gun 116 is located at a desired section of the wellbore 102, the setting tool 120 may be activated to set the plug 122 at a lower (e.g., toe) end of the wellbore 102. After placing the plug 122 within the wellbore 102, the wireline 112 may be partially retracted to move the perforating gun 116 to a desired location within a particular section of the wellbore 102. The perforating gun 116 may be discharged to fire a shaped charge into the casing 108, the cement 110, and the earth formation 103 to form perforations 118 in each of the casing 108, the cement 110, and the earth formation 103.

Perforating the casing 108, the cement 110, and the earth formation 103 may leave casing and cement residues within the wellbore 102 and proximate the perforations 118. In some embodiments, the residues may obstruct flow paths of formation fluids through the perforations 118 and into the wellbore 102 for production. In some embodiments, after forming the perforations, an acid treatment is performed to dissolve the residual cement and calcareous materials (e.g., calcium carbonate) from the wellbore 102. The acid treatment may further be formulated and configured to reduce precipitation of calcium fluoride and dissolve salt or rust to avoid precipitation of gelatinous and highly insoluble ferric hydroxide (Fe(OH)$_3$) in the wellbore 102. The acid treatment may also be formulated and configured to displace formation brines that include potassium, sodium, and calcium ions away from the wellbore 102 to reduce the likelihood of crystallization of fluorosilicate that would otherwise plug the pores of the earth formation 103 after fracturing. The acid treatment may include introducing an acid solution into the wellbore 102. The acid solution may be referred to as a "spearhead". The acid solution may be provided to the wellbore 102 through, for example, the first fluid conduit 140 or the second fluid conduit 142, through the wellhead 138 and to the wellbore 102. The acid solution may flow through the wellbore 102 and through the perforations 118 in the casing 108 and the cement 110.

The acid solution may include one or more acids. In some embodiments, the acid solution includes hydrochloric acid. A concentration of the acid (e.g., hydrochloric acid) in the acid solution may be within a range of from about 5.0 weight percent to about 30.0 weight percent, such as from about 5.0 weight percent to about 10.0 weight percent, from about 10.0 weight percent to about 15.0 weight percent, from about 15.0 weight percent to about 20.0 weight percent, from about 20.0 weight percent to about 25.0 weight percent, or from about 25.0 weight percent to about 30.0 weight percent. In some embodiments, the concentration of the acid in the acid solution is at least about 10.0 weight percent, such as at least about 15.0 weight percent, at least about 20.0 weight percent, at least about 25.0 weight percent, or even at least about 28.0 weight percent. In some embodiments, the acid solution includes hydrochloric acid. However, the disclosure is not so limited, and the concentration of the acid may be different than that described.

In some embodiments, prior to introducing the acid solution to the wellbore 102, the wireline 112 is removed (tripped) from the wellbore 102. In other embodiments, the wireline 112 remains in the wellbore 102 during the acid treatment. In some embodiments, performing the acid treatment while the wireline 112 is in the wellbore 102 facilitates improved operation of the wellbore 102. For example, perforations and acid stimulation (acid treatment) operations may be performed faster since the wireline 112 is not tripped from the wellbore 102 for each stage of perforation and acid stimulation, reducing the overall time and expense of perforation and fracturing operations.

The acid solution may be pumped through the wellbore 102 and the perforations 118 in the casing 108, the cement 110, and the perforations 118 in the earth formation 103 to dissolve and remove any residual casing cement or other materials obstructing a flow path between the perforations 118 in the earth formation 103 and the wellbore 102. The acid may dissolve the cement and open pathways for a fracturing fluid to be provided to the wellbore 102. As described above, the acid solution may be provided to the wellbore 102 in the presence of the wireline 112 or after the wireline 112 is removed from the wellbore 102.

In addition to the acid, the acid solution may include an acid inhibitor composition formulated and configured to reduce an amount of corrosion of the wireline 112, the wellbore 102, wellbore equipment, surface equipment, and surface piping when such materials are exposed to the acid solution and/or to other materials or processes during operation of the wellbore 102. The corrosion inhibitor composition may be formulated and configured to reduce and/or prevent corrosion of one or more metals including one or more of zinc, nickel, copper, chromium, aluminum, iron, steel, alloys thereof, or combinations thereof. For example, the corrosion inhibitor composition may facilitate the use of the wireline 112 within the wellbore 102 while performing one or more wellbore operations that include the use of an acid, such as stimulation and acidization operations. In some embodiments, the corrosion inhibitor composition reduces and/or prevents the corrosion of zinc and iron that may be present in the wireline 112.

In addition to reducing and/or preventing corrosion of the wireline 112, the acid inhibitor composition may reduce and/or prevent corrosion of other downhole components, downhole tools, surface equipment, and/or surface piping. For example, the corrosion inhibitor composition may reduce and/or prevent corrosion of the casing 108, surface equipment and surface piping such as the wellhead 138, the fluid flow control system 135, the first pump 144, the second pump 146, frac pumps, the first fluid conduit 140, and the second fluid conduit 142, and other equipment that may be exposed to corrosive materials (e.g., corrosive fluids, corrosive processes). The corrosion inhibitor composition may be formulated and configured to reduce and/or prevent acid corrosion, electrochemical corrosion caused by formation water and formation brines, hydrogen sulfide ($H_2S$) corrosion, corrosion caused by chlorine-based biocides (e.g., sodium hypochlorite (bleach), chlorine dioxide), or other types of corrosion.

With continued reference to FIG. 1, after forming the perforations 118 and performing the acid treatment, a hydraulic fracturing fluid (also simply referred to herein as a "fracturing fluid") may be provided to the wellbore 102 to open the perforations 118 and form fractures within the earth formation 103. The fracturing fluid may be provided to the wellbore 102 through the wellhead 138 via, for example, one of the first fluid conduit 140 or the second fluid conduit 142.

The fracturing fluid may be provided at a sufficient pressure to initiate fractures within the earth formation 103. The fracturing fluid may include water, one or more proppants, and one or more chemical additives. For example, the fracturing fluid may include proppants such as solid particles including sand, sintered bauxite, ceramic materials, resin-coated sand, or other particles sized, shaped, and configured to enter the fractures and maintain an open position of the fractures after the earth formation 103 and fractures are no longer exposed to the high pressures of the fracturing fluid. The solid particles may be sized and shaped to facilitate maintaining the openings in the fractures after the fracturing fluid is no longer circulated to the wellbore 102. In some embodiments, during the course of a fracturing process, the size of the proppant may gradually be increased to facilitate opening larger fractures as the fracturing process progresses.

The chemical additives that may be present in the fracturing fluid may include friction reducers, biocides (such as chlorine-based biocides (e.g., sodium hypochlorite (bleach), chlorine dioxide)), scale inhibitors, clay stabilizers, iron control agents, gelling agents, crosslinkers, breaker fluids, pH adjusters, and foaming agents. In some embodiments, the chemical additives constitute from about 0.5 weight percent to about 98.0 weight percent of the fracturing fluid. However, the disclosure is not so limited, and the chemical additives may constitute a different weight percent of the fracturing fluid.

The proppant may constitute from about 0.5 weight percent to about 10.0 weight percent of the fracturing fluid, such as from about 0.5 weight percent to about 1.0 weight percent, from about 1.0 weight percent to about 2.0 weight percent, from about 2.0 weight percent to about 4.0 weight percent, from about 4.0 weight percent to about 6.0 weight percent, from about 6.0 weight percent to about 8.0 weight percent, or from about 8.0 weight percent to about 10.0 weight percent of the fracturing fluid. However, the disclosure is not so limited, and the proppant may constitute a different amount of the fracturing fluid. In some embodiments, during the fracturing operation, a concentration of the proppant may be increased. For example, a concentration of the proppant in the fracturing fluid may increase as the fracturing operation progresses.

In some embodiments, the wireline 112 may remain in the wellbore 102 while providing the fracturing fluid to the wellbore 102. In other embodiments, the wireline 112 is removed from the wellbore 102 prior to providing the fracturing fluid to the wellbore 102 and forming the fractures in the earth formation 103. As described herein, the fracturing fluid may include the corrosion inhibitor composition to reduce and/or prevent corrosion of the wellbore equipment and/or the wireline during the fracturing operation. For example, the corrosion inhibitor composition may reduce corrosion caused by exposure to chlorine-based biocides (e.g., sodium hypochlorite and/or chlorine dioxide) that may be present in the fracturing fluid.

After forming the fractures in the earth formation 103, a flushing fluid may be provided to the earth formation to remove proppant and any remaining fracturing fluid from the wellbore 102. The flushing fluid may be provided through the wellhead 138 (e.g., via one of first fluid conduit 140 or the second fluid conduit 142) and through the perforations 118 in the casing 108 and cement 110 to the perforations 118 and the fractures. The flushing fluid may displace and remove fracturing fluid that may remain in the wellbore 102. In some embodiments, the sweep fluid includes water.

As described above, the corrosion inhibitor composition may be formulated and configured to protect the wireline 112 and other components of wellbore equipment from corrosion. For example, the corrosion inhibitor composition may be formulated and configured to reduce and/or prevent corrosion of one or more of the casing 108, surface equipment and surface lines such as the wellhead 138, the fluid flow control system 135, the first pump 144, the second pump 146, frac pumps, the first fluid conduit 140, and the second fluid conduit 142, and other equipment that may be exposed to corrosive fluids.

The corrosion inhibitor composition may be provided to the wellbore 102 with one or more fluids that are provided to the wellbore 102. For example, the corrosion inhibitor composition may be provided to the wellbore 102 with one or more of (e.g., each of) the acid solution, the fracturing fluid, the flushing fluid, or another fluid. In some embodiments, the corrosion inhibitor composition may be provided to the wellbore 102 with the fracturing fluid. In other words, the fracturing fluid may include the corrosion inhibitor composition. In some embodiments, the corrosion inhibitor composition is provided to the wellbore 102 with the flushing fluid.

A concentration of the corrosion inhibitor composition in the fluid may be within a range of from about 0.5 weight percent to about 5.0 weight percent, such as from about 0.5 weight percent to about 1.0 weight percent, from about 1.0 weight percent to about 2.0 weight percent, from about 2.0 weight percent to about 3.0 weight percent, from about 3.0 weight percent to about 4.0 weight percent, or from about 4.0 weight percent to about 5.0 weight percent of the fluid. In some embodiments, the corrosion inhibitor composition constitutes from about 1.0 weight percent to about 3.0 weight percent of the fluid, such as about 1.5 weight percent of the fluid. In some embodiments, such as where the corrosion inhibitor composition is provided to the wellbore 102 with a fluid including an acid, the fluid may include from about 1.0 part by weight to about 5.0 parts by weight of the acid for every about 1.0 part by weight of the corrosion inhibitor composition, such as from about 1.0 part by weight to about 2.0 parts by weight, from about 2.0 parts by weight to about 3.0 parts by weight, from about 3.0 parts by weight to about 4.0 parts by weight, or from about 4.0 parts by weight to about 5.0 parts by weight of the acid for every about 1.0 part by weight of the corrosion inhibitor composition.

The corrosion inhibitor composition may include an alkenylphenone corrosion inhibitor and a substituted 1-azanaphtalene (an N-substituted quinoline) corrosion inhibitor. The corrosion inhibitor composition may further include a carrier fluid (e.g., water), one or more surfactants, and one or more additional additives.

Figure 2:
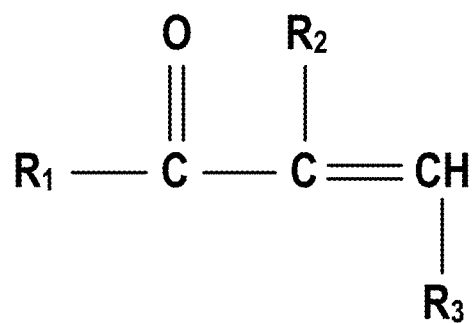
FIG. 2 is a schematic of a structure of an alkenylphenone of a corrosion inhibitor composition, according to at least one embodiment of the disclosure.

The alkenylphenone corrosion inhibitor may have the general structure shown in structure (I) below and illustrated in FIG. 2,

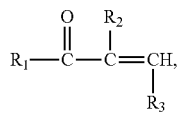

wherein $R_1$ is an unsubstituted or inertly substituted aryl having 6 carbon atoms to 10 carbon atoms, and $R_2$ and $R_3$ may each individually include hydrogen, a halogen, or an inertly substituted aliphatic material (e.g., an alkane) having 3 carbon atoms to 12 carbon atoms, an unsubstituted or inertly substituted aryl having 6 carbon atoms to 10 carbon atoms, provided that the total number of carbon atoms in said alkenylphenone does not exceed 16. $R_2$ may be an alkanol, an ether, or an unsubstituted or inertly substituted aryl having 6 carbon atoms to 10 carbon atoms. Inert substitutions for each of $R_1$, $R_2$, and $R_3$ may include $C_1$ to $C_4$ alkyl groups, a halogen or a halogen-containing group, an ether, an alkoxy group, or a nitro group. $R_2$ and $R_3$ may be the same or may be different than one another.

In some embodiments, the corrosion inhibitor composition may be formed from one or more precursors, such as one or more of 5-benzoyl-1,3-dioxane, 2-benzoyl-1,3-dimethoxy-propane, 3-hydroxy-1-phenyl-1-propanone, an alpha-hydroxy vinylidene compound (e.g., 2-benzoyl-3-hydroxy-1-propene), a hydroxyl ketone (e.g., 3-hydroxy-1-phenyl-1-propanone), another precursor, or combinations thereof. For example, one or more of 5-benzoyl-1,3-dioxane, 2-benzoyl-1,3-dimethoxy-propane, or 3-hydroxy-1-phenyl-1-propanone may form the alkenylphenone corrosion inhibitor when exposed to hydrochloric acid at a temperature of about 65° C.

The alkenylphenone corrosion inhibitor may include 2-benzoyl-3-methoxy-1-propene, 2-benzoyl-3-hydroxyl-1-propene. In some embodiments, the alkenylphenone corrosion inhibitor includes 2-benzoyl-3-methoxy-1-propene.

The alkenylphenone corrosion inhibitor may constitute from about 5.0 weight percent to about 15.0 weight percent of the corrosion inhibitor composition, such as from about 5.0 weight percent to about 7.5 weight percent, from about 7.5 weight percent to about 10.0 weight percent, from about 10.0 weight percent to about 12.5 weight percent, or from about 12.5 weight percent to about 15.0 weight percent of the corrosion inhibitor composition. In some embodiments, the alkenylphenone corrosion inhibitor constitutes about 7.5 weight percent of the corrosion inhibitor composition. However, the disclosure is not so limited, and the alkenylphenone corrosion inhibitor may constitute a different amount of the corrosion inhibitor composition than that described.

Figure 3:
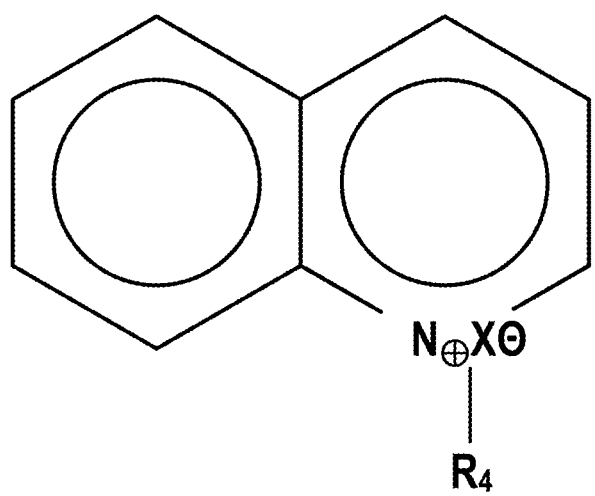
FIG. 3 is a schematic of a structure of a 1-azanaphtalene of the corrosion inhibitor composition, according to at least one embodiment of the disclosure.

The N-substituted quinoline corrosion inhibitor of the corrosion inhibitor composition may include an N-substituted quinoline (e.g., a substituted 1-azanaphtalene). The N-substituted quinoline may be in the form of a salt, such as a quinolinium salt having the general structure shown in structure (II) below and illustrated in FIG. 3,

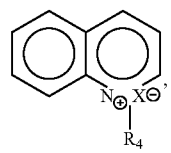

wherein $R_4$ is an unsubstituted or an inertly substituted alkyl having 4 carbon atoms to 16 carbon atoms, or an unsubstituted or inertly substituted alkylaryl having 7 carbon atoms to 20 carbon atoms. Inert substituents may not have an adverse effect on the corrosion inhibition properties of the corresponding unsubstituted N-alkyl or N-alkylaryl quinolinium salts. In structure (II), X may be a halide, such as Cl⁻, Br⁻. In some embodiments, the quinolinium salt is 1-(α-naphthylmethyl)-quinolinium chloride.

In some embodiments, the quinoline is substituted with a similar or larger fused-ring structure, such as isoquinoline (e.g., 2-azanaphthalene), acridine (e.g., 9-azaanthracene), phenanthridine (e.g., 3,4-benzoquinoline), β-naphthoquinoline (e.g., 5,6-benzoquinoline), or α-naphthoquinoline (e.g., 7,8-benzoquinoline).

The N-substituted quinoline corrosion inhibitor may constitute from about 15.0 weight percent to about 35.0 weight percent of the corrosion inhibitor composition, such as from about 15.0 weight percent to about 20.0 weight percent, from about 20.0 weight percent to about 25.0 weight percent, from about 25.0 weight percent to about 30.0 weight percent, or from about 30.0 weight percent to about 35.0 weight percent of the corrosion inhibitor composition. In some embodiments, the N-substituted quinoline corrosion inhibitor constitutes from about 20.0 weight percent to about 25.0 weight percent of the corrosion inhibitor composition. In some embodiments, the N-substituted quinoline corrosion inhibitor constitutes greater than about 20.0 weight percent of the corrosion inhibitor composition. However, the disclosure is not so limited, and the N-substituted quinoline corrosion inhibitor may constitute a different amount of the corrosion inhibitor composition than that described.

A ratio by weight of the N-substituted quinoline corrosion inhibitor to the alkenylphenone corrosion inhibitor in the corrosion inhibitor composition may be within a range of from about 2.0:1.0 to about 5.0:1.0, such as from about 2.0:1.0 to about 2.5:1.0, from about 2.5:1.0 to about 3.0:1.0, from about 3.0:1.0 to about 3.5:1.0, from about 3.5:1.0 to about 4.0:1.0, from about 4.0:1.0 to about 4.5:1.0, or from about 4.5:1.0 to about 5.0:1.0. In some embodiments, the ratio by weight of the N-substituted quinoline corrosion inhibitor to the alkenylphenone corrosion inhibitor is between about 3.0:1.0 to about 3.5:1.0. In other words, for every about 1.0 part by weight of the N alkenylphenone corrosion inhibitor, the corrosion inhibitor composition includes between about 3.0 parts by weight and about 3.5 parts by weight of the -substituted quinoline corrosion inhibitor.

The corrosion inhibitor composition may include one or more surfactants. The one or more surfactants may include one or more quaternary ammonium salts (e.g., cetyl trimethyl ammonium bromide; also referred to as cetrimonium bromide (CTAB), alkyl pyridinium chlorides, aryl pyridinium chlorides, alkyl pyridinium bromides, aryl pyridinium bromides, quinolinium quaternary ammonium salts, imidazoline quaternary ammonium salts), an ethoxylated adduct of trimethyl-1-heptanol, ethoxylated tridecyl alcohol, dodecylpyridinium bromide (DDPB), methylnaphtylisopropyl ether (1-isopropoxymethylnapthalene), 1,3-dimethoxy-2-benzoylpropane, 1-chloromethyl naphthalene, 3-hydroxy-1-phenyl-1-propanone, another surfactant, or combinations thereof.

When present in the corrosion inhibitor composition, the quinoline may constitute from about 1.0 weight percent to about 3.0 weight percent of the corrosion inhibitor composition, such as from about 1.0 weight percent to about 1.5 weight percent, from about 1.5 weight percent to about 2.0 weight percent, from about 2.0 weight percent to about 2.5 weight percent, or from about 2.5 weight percent to about 3.0 weight percent of the corrosion inhibitor composition. In some embodiments, quinoline constitutes from about 1.5 weight percent to about 2.0 weight percent of the corrosion inhibitor composition. However, the disclosure is not so limited, and quinoline may constitute a different amount of the corrosion inhibitor composition than that described.

Figure 4:
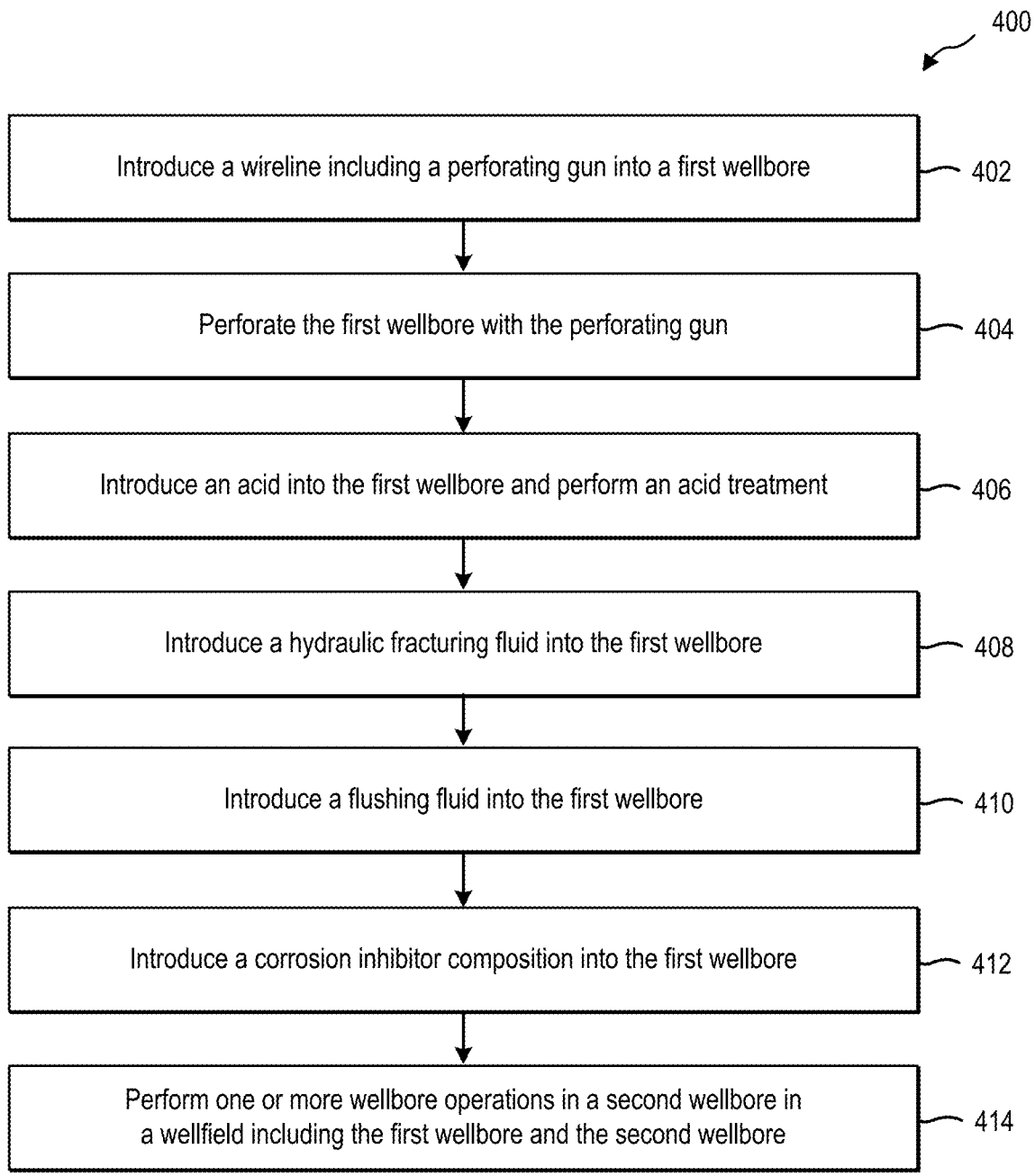
FIG. 4 is a simplified flow diagram illustrating a method of providing a corrosion inhibitor to a wellbore, according to at least one embodiment of the present disclosure.

FIG. 4 is a simplified flow diagram illustrating a method 400 of providing a corrosion inhibitor to one or more wellbores of a wellfield, according to at least one embodiment of the present disclosure. The method 400 may include introducing a wireline including a perforating gun into a first wellbore, as shown in act 402. In some embodiments, act 402 includes placing a plug within the first wellbore and placing the perforating gun uphole of the plug proximate a location of the first wellbore and the earth formation where perforations and fractures will be formed.

Responsive to introducing the wireline and the perforating gun into the first wellbore, the method 400 includes perforating the first wellbore with the perforating gun, as shown in act 404. In some embodiments, perforating the first wellbore includes directing a shaped charge through perforations in the perforating gun towards the first wellbore, such as towards casing of the first wellbore. Perforating the first wellbore may include perforating the casing, cement (if present), and neighboring regions of the earth formation through which the first wellbore extends. In some embodiments, perforating the first wellbore includes providing an electrical signal from a surface of the wellbore, through the wireline, and to the perforating gun to discharge the perforating gun.

The method 400 may further include, responsive to perforating the first wellbore, introducing an acid into the first wellbore to perform an acid treatment, as shown in act 406. In some embodiments, introducing the acid into the first wellbore includes pretreating the first wellbore and the perforations prior to performing a fracturing operation. In some embodiments, the acid is provided to the first wellbore from a surface (e.g., such as through a fluid conduit (e.g., the first fluid conduit 140, the second fluid conduit 142)). In other embodiments, the acid is provided to a desired location of the wellbore, such as through coiled tubing extending through the first wellbore. The acid may dissolve debris in the wellbore and the earth formation, such as debris remaining after perforation and/or after drilling operations. In some embodiments, introducing the acid into the first wellbore includes performing an acidization process. The acidization process may include one or more of matrix acidizing, fracturing acidizing, or breakdown acidizing. In some embodiments, introducing the acid includes reducing a breakdown pressure of the earth formation.

With continued reference to FIG. 4, the method 400 may further include introducing a fracturing fluid into the first wellbore, as shown in act 408. Introducing the fracturing fluid into the first wellbore includes pumping the fracturing fluid into the wellbore and through the perforations in the casing, the cement, and the perforations in the earth formation. The fracturing fluid may be provided from a surface (e.g., through a fluid conduit) to the first wellbore. In some embodiments, the fracturing fluid is provided at a sufficient pressure to induce fractures in the earth formation to increase a permeability of the earth formation. The fracturing fluid may include one or more of the fracturing fluids described above and may include, for example, water, one or more proppants, and one or more chemical additives. In some embodiments, the composition of the fracturing fluid may be changed during a fracturing process. For example, a concentration of the one or more proppants may be changed (e.g., increased) over the course of the fracturing process. In some embodiments, and as described herein, in some embodiments, the fracturing fluid further includes a corrosion inhibitor composition.

The method 400 may further include introducing (e.g., flushing, sweeping) a flushing fluid into the first wellbore, as shown in act 410. The flushing fluid (e.g., an overflush fluid) may include a weak acid solution and/or a brine solution and may be configured to remove the fracturing fluid from the earth formation and the first wellbore, while the proppants remain in the fractures of the earth formation. In some embodiments, the flushing fluid further includes the corrosion inhibitor composition. In some embodiments, the wireline is in the first wellbore while introducing the flushing fluid into the first wellbore.

With continued reference to FIG. 4, the method 400 may further include introducing a corrosion inhibitor composition into the first wellbore, as shown in act 412. The corrosion inhibitor composition may include one or more of the corrosion inhibitor compositions described above. For example, the corrosion inhibitor composition may include one or more alkenylphenone corrosion inhibitor and one or more N-substituted quinoline corrosion inhibitor, as described above. Introducing the corrosion inhibitor composition into the first wellbore may include introducing the corrosion inhibitor composition into the first wellbore with one or more of the wireline in act 402, the acid in act 406, the fracturing fluid in act 408, the flushing fluid in act 410, or after one or more of the acid, the fracturing fluid, or the flushing fluid. In some embodiments, act 412 includes introducing the corrosion inhibitor composition before introducing the hydraulic fracturing fluid into the first wellbore. In some embodiments, act 412 includes introducing the corrosion inhibitor composition into the first wellbore with the hydraulic fracturing fluid. In some embodiments, the corrosion inhibitor composition is provided with the wireline. Accordingly, one or more of the acid, the fracturing fluid, or the flushing fluid may include the corrosion inhibitor composition. The corrosion inhibitor composition may be present in the respective one or more of the acid, the fracturing fluid, or the flushing fluid at a concentration within a range of from about 1.0 weight percent to about 15.0 weight percent, as described above with reference to the corrosion inhibitor composition.

In some embodiments, the wireline remains in the first wellbore when introducing the acid to the first wellbore during act 406. In some embodiments, the fracturing fluid includes the corrosion inhibitor composition. In some such embodiments, the corrosion inhibitor composition may reduce (e.g., prevent, substantially prevent) corrosion of the wireline (if present in the first wellbore), wellbore equipment, and surface equipment (e.g., the wellhead, fracturing pumps, surface piping (lines), surface valves) during the fracturing process. The wireline may remain in the first wellbore during the fracturing process. In some embodiments, the corrosion inhibitor composition is provided to the first wellbore with the flushing fluid. In some embodiments, the wireline remains in the first wellbore when providing the flushing fluid to the first wellbore.

With continued reference to FIG. 4, in some embodiments, the method 400 further performing one or more wellbore operations in a second wellbore in a wellfield including the first wellbore and the second wellbore, as shown in act 414. In some embodiments, the one or more wellbore operations includes one or more of (e.g., each of) perforating the second wellbore with a perforating gun (as described above with reference to the first wellbore and act 404); introducing an acid into the second wellbore (as described above with reference to the first wellbore and act 406); introducing a fracturing fluid into the second wellbore (as described above with reference to the first wellbore and act 408); introducing a flushing fluid into the second wellbore (as described above with reference to the first wellbore and act 410); or introducing a corrosion inhibitor composition into the second wellbore (as described above with reference to the first wellbore and act 412). In some embodiments, the corrosion inhibitor composition may remain in the first wellbore during act 414.

While the method 400 has been described and illustrating as including a series of acts in a particular order, the disclosure is not so limited. It will be understood that the acts of the method 400 may be performing in a different order than that illustrated and described. For example, the method 400 may include introducing the flushing fluid into the first wellbore after introducing the fracturing fluid into the first wellbore, the disclosure is not so limited. In other embodiments, the method 400 includes introducing the flushing fluid into the first wellbore before introducing the fracturing fluid into the first wellbore, the disclosure is not so limited.

While the method 400 has been described as reducing corrosion of one or more of wellbore components, surface equipment, and/or surface lines, the disclosure is not so limited. In other embodiments, the corrosion inhibitor composition is provided to a cooling tower, a water treatment facility, or other processes or equipment which are prone to corrosion. In some embodiments, the corrosion inhibitor composition is used in a wellbore intervention process. For example, a hydrocarbon producing wellbore may be producing a given rate of hydrocarbons (e.g., 1 barrel per day, 2 barrels per day) with a pump jack. In some embodiments, the corrosion inhibitor composition facilitates acidizing a producing wellbore while the wellbore is producing and while the production equipment remains in the producing wellbore.

Figure 5:
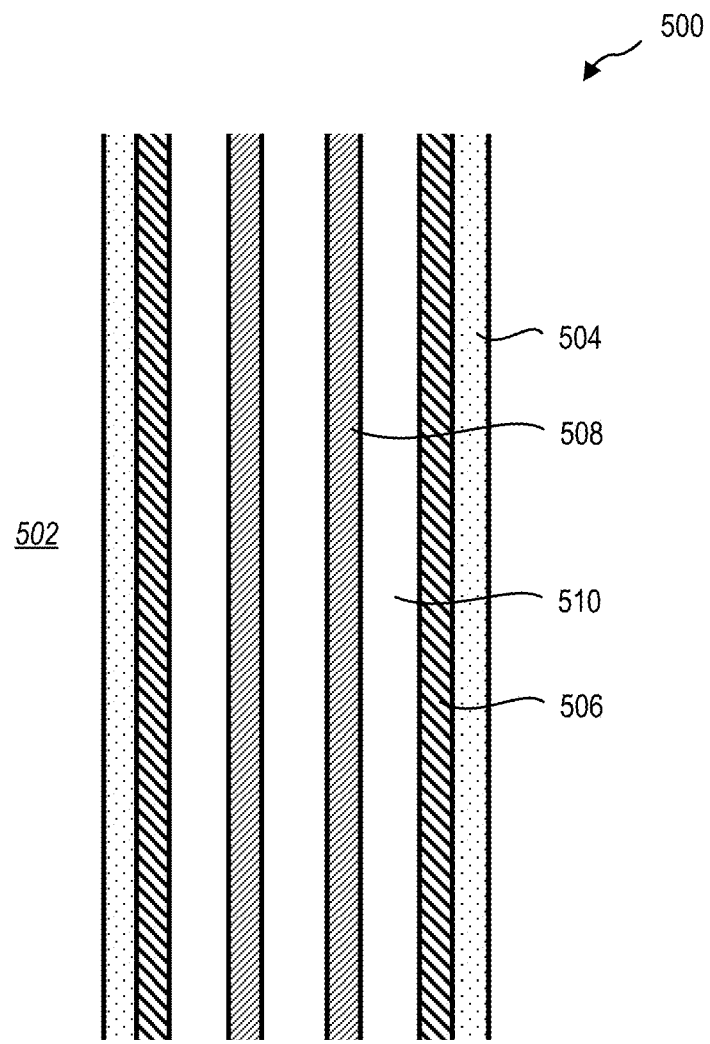
FIG. 5 is a simplified representation of a portion of a producing wellbore, according to at least one embodiment of the present disclosure.

FIG. 5 is a simplified representation of a portion of a producing wellbore 500, according to at least one embodiment of the present disclosure. The wellbore 500 may extend through an earth formation 502. The wellbore 500 may include, for example, cement 504 contacting the earth formation and between a casing 506 and the earth formation 502. In some embodiments, the wellbore 500 does not include the cement 504 and the casing 506 is proximate the earth formation 502. The wellbore 500 further includes production tubing 508 extending therethrough. An annulus 510 is between an outer wall of the production tubing 508 and an inner wall of the casing 506. In some embodiments, produced fluids (e.g., produced hydrocarbons) flow upwardly through the production tubing 508.

In some embodiments, the production tubing 508 extends into a producing zone of the earth formation 502. The producing zone may include one or more perforations and/or fractures, as described above with reference to FIG. 1. In some embodiments, the earth formation 502 (e.g., the producing zone) may be stimulated, such as by providing an acid stimulation fluid to the wellbore 500. The acid stimulation fluid may be provided to the earth formation 502 through, for example, the annulus 510. In some embodiments, the acid stimulation fluid includes an acid (e.g., hydrochloric acid). The acid stimulation fluid may further include the corrosion inhibitor composition. In some embodiments, the acid stimulation fluid includes about 1.0 part by weight of the corrosion inhibitor composition for every about 5.0 parts by weight of the acid.

In some embodiments, the earth formation 502 may be exposed to the acid stimulation fluid including the corrosion inhibitor composition while the wellbore 500 includes production equipment, such as the production tubing 508, a producing pump or jack, and/or other production equipment.

Accordingly, the corrosion inhibitor composition may facilitate acid intervention (e.g., acid stimulation) of a producing wellbore without removing the production equipment from the wellbore. The corrosion inhibitor composition may reduce and/or prevent corrosion of the production equipment. After performing the acid stimulation, production via the production tubing 508 may be resumed.

Although certain embodiments of the present disclosure are described with respect to inhibiting or minimizing corrosion to a component used in a wellbore or during spearhead acid operations, it should be understood that such an application is merely exemplary and non-limiting. Other applications in which such techniques may be applied include completion brines, filter cake removal, acid pickling, scale removal, fresh water, re-used produced water, matrix stimulation fluids, acid fracturing fluids, scale dissolving fluids, or any other suitable application (e.g., applications that require utilizing an inhibited hydrochloric acid or organic acid).

In some embodiments, the corrosion inhibitor composition may reduce and/or prevent corrosion during removal of scale from surface piping. For example, surface piping may become scaled, such as after producing water through the surface piping. The scale may be removed by exposing the scale to one or more acid solutions. In some embodiments, the acid solution includes the corrosion inhibitor composition which reduces and/or prevents corrosion of the surface piping.

In some embodiments, the corrosion inhibitor composition may be provided to a completion fluid, such as a completion brine. The completion brine may include an aqueous solution of inorganic salts, such as chlorides, bromides, and formates. The completion brine may be circulated through the wellbore after drilling operations to displace residual solids during completion activities and prepare the wellbore for production. For example, the completion brine may be circulated through a drill string or tubing (e.g., production tubing 508), into the annulus (e.g., annulus 510), and back to a surface through the annulus. In some embodiments, completion brines may include salts or other additives that may cause corrosion to wellbore equipment present in the wellbore, such as piping and tubing in the wellbore, wellbore equipment such as pumps and valves, bottomhole tools, surface piping, surface pumps, the wellhead, or other equipment associated with the wellbore. The corrosion inhibitor composition may reduce and/or prevent corrosion (e.g., electrochemical corrosion) caused by such brines.

The corrosion inhibitor composition may reduce and/or prevent corrosion at temperatures and pressures that may be encountered downhole, within a wellbore. The corrosion inhibitor composition may be configured to reduce corrosion at temperature of at least (up to) about 121.1° C. (about 250° F.), or even at least about 135° C. (about 275° F.). For example, the corrosion inhibitor composition may reduce corrosion of an acid fluid (e.g., a spearhead fluid) including up to about 28% HCl at a temperature up to about 121.1° C.

Without being bound by any particular theory, it is believed that the corrosion inhibitors of the corrosion inhibitor composition (e.g., the alkenylphenone and the substituted 1-azanaphthalene) form a protective film on surfaces of materials (e.g., metals) which are contacted by the corrosion inhibitor composition. The protective film of the corrosion inhibitor composition reduces and/or prevents corrosive attack of the components which are covered or protected by the protective film.

Accordingly, the corrosion inhibitor composition may protect one or more wellbore components, surface equipment, and/or surface lines from corrosion. For example, the corrosion inhibitor composition may be provided to the first wellbore, the second wellbore, and/or additional wellbores of the wellfield during one or more wellbore operations are performed in one or more wellbores of the wellfield. In some embodiments, the corrosion inhibitor composition reduces and/or prevents corrosion of one or more wellbore components, surface equipment, and/or surface lines of a wellbore while the wellbore includes a fracturing fluid, a flushing fluid, or an acid (such as an acid stimulation fluid). In some embodiments, the corrosion inhibitor composition is present in a first wellbore while one or more wellbore operations are being performed on a second wellbore of the wellfield.

The corrosion inhibitor composition may reduce and/or prevent one or more of chemical corrosion caused by acids; electrochemical corrosion caused by formation water, formation brines, or produced water; chlorine-based corrosion, such as corrosion caused by chlorine-based biocides; corrosion caused by hydrogen sulfide; or other types of corrosion.

EXAMPLES

Corrosion testing was conducted at 125° F. (about 51.7° C.) resembling a typical downhole condition in North America. Single-time exposure and repeated exposure of a wireline to the acid composition were tested. A single-time exposure refers to a test where a zinc wire was exposed to the acid for a certain period of time at 125° F. and weight loss is determined from the initial weight and the final weight of the zinc wire. Repeated exposure refers to a test where a zinc wire was tested multiple times to assess the durability of the zinc wire under several acid treatments, depicting multiple runs of a wireline cable. The weight of the zinc layer of the zinc wire was measured to be about 4-5% of the total wire weight of the zinc wire.

Example 1—Single-Time Exposure

Table 2 shows the weight loss of respective zinc coated wireline samples after exposure to three fluids as a function of time to indicate severity of corrosion. The three fluids include one industrial benchmark product (HCR-7000WL), which included an industrial corrosion inhibitor in a 15% HCl solution with other corrosion protection additives. The fluid was reported to be applied in the field after dilution with water at 1:1 ratio such that the fluid including 7.5% HCl and the industrial corrosion inhibitor.

The other two fluids were 7.5% HCl solutions inhibited by a conventional corrosion inhibitor composition (CI-B), and 7.5% HCl inhibited by the corrosion inhibitor composition of the present disclosure (including the alkenylphenone and the substituted 1-azanaphthalene) (CI-A). The industrial benchmark corrosion inhibitor HCR-7000WL was diluted with DI-water with a ratio of 1:1 based on the data published by the vendor. The other two corrosion inhibitors (CI-A and CI-B) were tested in 7.5% HCl solutions to match the acid strength in the diluted HCR-7000WL fluid.

TABLE 2

| Exposure time | Weight loss (%) as a function of the test duration (hr) | | | |
|---|---|---|---|---|
| | 1 | 2 | 4 | 6 |
| 1:1 diluted HCR-7000WL | 5.28 | 5.23 | 6.03 | 6.05 |
| 7.5% HCl + 1.75 CI-B | 6.00 | 5.87 | 5.82 | 6.35 |
| 7.5% HCl + 0.85% CI-A | 0.21 | 0.20 | 0.26 | 0.57 |

Table 2: Weight loss after corrosion testing at 125° F. in 7.5% HCl using zinc coated wirelines.

The zinc layer or the zinc coated wireline was estimated to be 4-5% of the wireline mass. Since the weight loss in the first two rows in Table 2 is greater than these values, the data in Table 2 suggests that the zinc layer is completely dissolved in acid when 1:1 diluted HCR-7000WL and 7.5% HCl with (CI-B) fluids were used. Dissolution of the zinc layer results in exposure of the wireline steel to the acid, further corrosion, and severe damage to the wireline and its mechanical integrity, which eventually will have a detrimental impact of the lifetime of the wire. The 7.5% HCl inhibited with CI-A was able to provide much better protection at each test duration and showed a maximum weight loss of 0.57% after 6 hours of exposure.

During the testing, the coupons of the zinc coated wireline were aggressively washed and cleaned after each test such that any deposited layers of corrosion inhibitor were likely removed using mechanical brushing and the application of acetone and isopropanol. Therefore, the data in Table 2 represents the most conservative data (the highest weight loss).

Example 2—Repeat Exposure

In the following tests, zinc coated wireline samples were cleaned, dried, and re-used after each test prior to the next corrosion test. The objective of these tests was to assess the durability of the zinc coated wireline samples after repeat exposure to the acid and corrosion inhibitor compositions. After each test, the samples were left under running water for ten seconds and then dried prior to weighing to measure the weight loss of the samples.

Table 3 below shows the weight loss of respective zinc coated wireline samples after exposure to two fluids: (1) 1:1 diluted HCR-7000WL; and (2) 7.5% HCl with 1.5% CI-A.

TABLE 3

| Test number | Weight loss (%) as a function of number of tests | | | | | | |
|---|---|---|---|---|---|---|---|
| | 1 | 2 | 3 | 4 | 5 | 6 | 7 |
| 1:1 diluted HCR-7000WL (Fluid 1) | 5.33 | 5.78 | 6.34 | 6.90 | 7.85 | 8.84 | 9.63 |
| 7.5% HCl + 1.5% CI-A (Fluid 2) | −0.40 | −0.59 | −0.42 | −0.53 | −0.56 | −0.61 | −0.51 |

Table 3: Weight loss after repeat corrosion testing at 125° F. using zinc coated wirelines.

Table 3 compares the cumulative weight loss of the zinc coated wireline samples at 125° F. after 4 hours of exposure to the two fluids. After the first test, the weight loss of the zinc coated wireline sample exposed to the fluid (1) including the industrial corrosion inhibitor was 5.33% after applying the gentler cleaning method described above. This result aligns with the data shown in Example 1 above indicating that the cleaning method does not have an impact and/or resulted in better protection of the zinc coated wireline samples to corrosion. Additionally, the result indicates that fluid (1) is ineffective in protecting the zinc layer of the zinc coated wireline samples.

The repetition of corrosion testing with the industrial corrosion inhibitor on the same zinc coated wireline samples resulted in a steady increase in the weight loss for each sample and reached a 9.6% weight loss after the 7th test (i.e., after a total of 28 hours of exposure to the acid at 125° F.). This may have resulted as an early failure to the wireline due to the impact of corrosion on the mechanical strength of the wire.

On the other hand, the weight loss data of the zinc coated wireline sample exposed to fluid (2) including the corrosion inhibitor composition described herein was significantly lower. The weight loss of the zinc coated sample was negative, indicating that corrosion inhibitor CI-A successively deposited a layer to protect the surface of the zinc coated sample to corrosion. Even with an aggressive method of removing the layer deposited by the corrosion inhibitor CI-A (e.g., as described in Example 1), the corrosion to the zinc coated wireline sample was much less, indicating that the deposited layer is impermeable, thereby providing better and longer protection to corrosion.

Figure 6A:
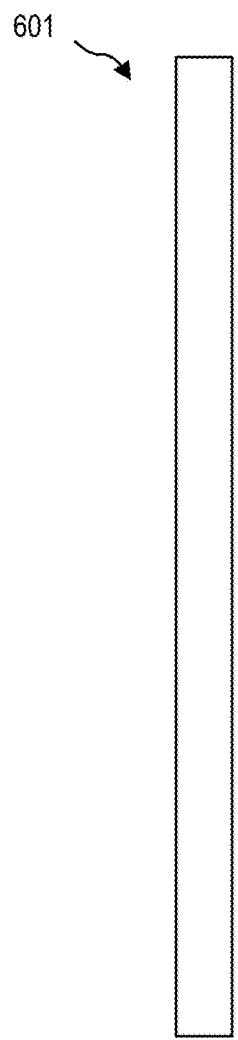
FIG. 6A is a simplified cross-sectional view of a zinc-coated wireline that has not been treated with a corrosion inhibitor.
Figure 6B:
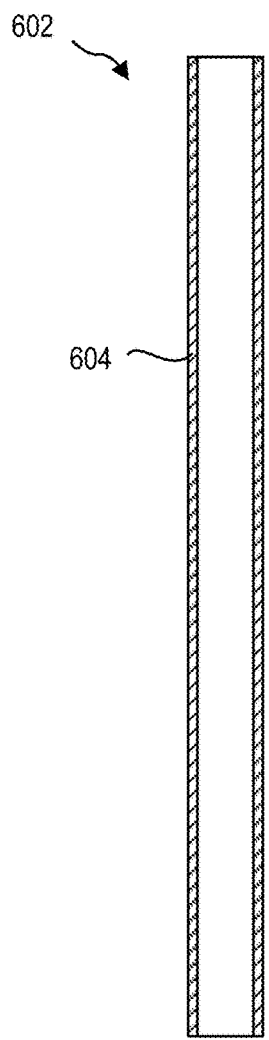
FIG. 6B is a simplified cross-sectional view of a zinc-coated wireline that was tested with the corrosion inhibitor composition described herein after exposure to an acid.
Figure 6C:
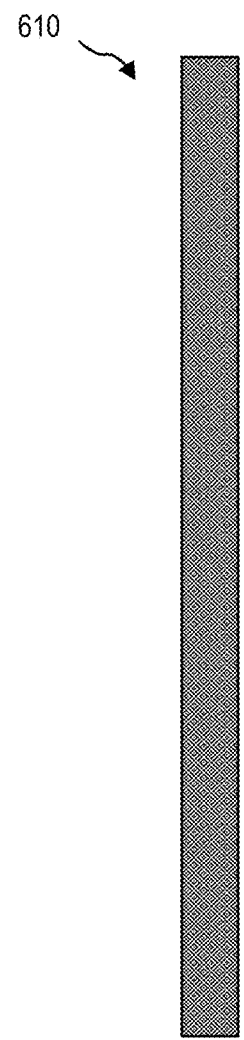
FIG. 6C is a simplified cross-sectional view of a zinc-coated wireline that was tested with a conventional corrosion inhibitor composition after exposure to an acid.

FIG. 6A is a simplified cross-sectional view of a zinc-coated wireline 601 that has not been treated with a corrosion inhibitor. FIG. 6B is a simplified cross-sectional view of a zinc-coated wireline 602 that was tested with fluid (2) (after the $7^{th}$ test). FIG. 6C is a simplified cross-sectional view of a zinc-coated wireline 610 that was tested with fluid (1) (after the $7^{th}$ test). With reference to FIG. 6B, the zinc-coated wireline 602 that was tested with fluid (2) had a dense brownish layer 604 covering the wireline, resembling the deposited layer of the corrosion inhibitor CI-A. It appeared that the layer 604 was the deposited corrosion inhibitor CI-A on outer portions of the zinc coated wireline 602. With reference to FIG. 6C, the zinc-coated wireline 610 tested with fluid (1) included indications of corrosion (e.g., pitting) on an outer surface thereof and had been thinned due to corrosion.

Figure 7A:
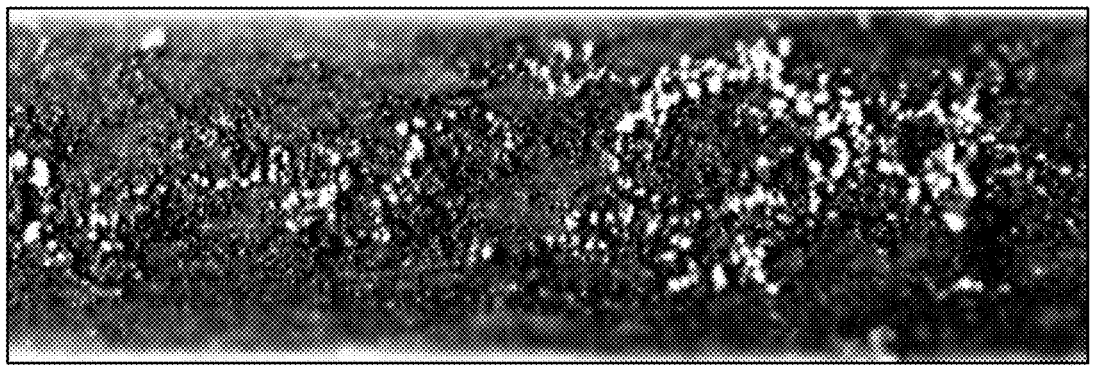
FIG. 7A and FIG. 7B show magnified pictures of the zinc coated wireline samples in two fluids.
Figure 7B:
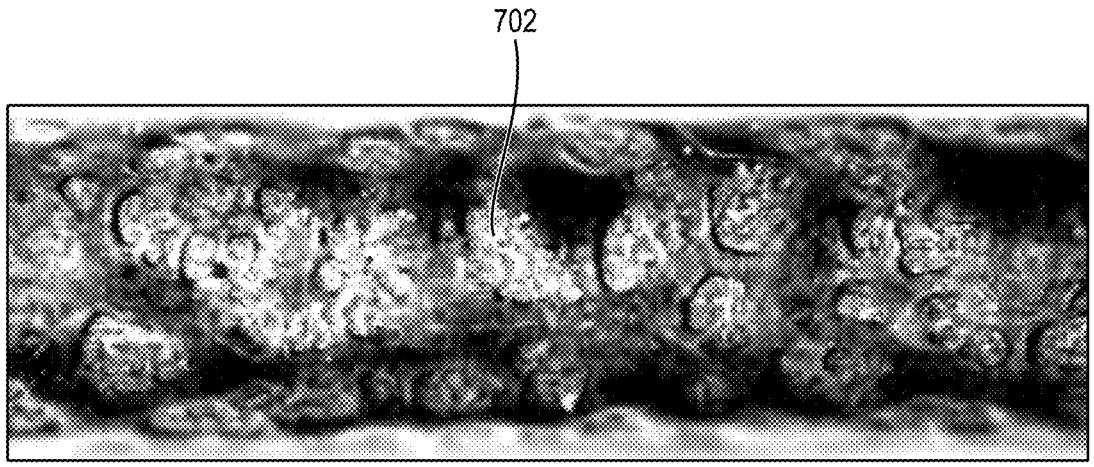

FIG. 7A and FIG. 7B are magnified pictures (5×) of the zinc coated wireline samples. FIG. 7A is a picture of the zinc coated wireline sample after exposure to the industrial corrosion inhibitor; and FIG. 7B is a picture of a zinc coated wireline sample after exposure to the corrosion inhibitor composition described herein. The zinc coated wireline of FIG. 7A exhibits significant damage and rust deposition on its surface, whereas the zinc coated wireline of FIG. 7B that was exposed to the corrosion inhibitor composition described herein clearly shows a protective layer 702 formed with inhibitor CI-A.

Table 4 shows the weight loss of respective zinc coated wireline samples after exposure to two fluids: (1) 1:2 diluted HCR-7000WL, and (2) 5% HCl with 1.0% CI-A.

TABLE 4

Weight loss after repeat corrosion testing at 125° F. using zinc coated wirelines.

| | Weight loss (%) as a function of number of tests | | | | | | |
|---|---|---|---|---|---|---|---|
| | 1 | 2 | 3 | 4 | 5 | 6 | 7 |
| 1:2 diluted HCR-7000WL | 5.67 | 6.00 | 6.62 | 7.38 | 8.38 | 9.46 | 10.18 |
| 5% HCl + 1.0% CI-A | −0.20 | −0.36 | −0.10 | −0.15 | −0.10 | −0.10 | −0.10 |

Table 4 compares the cumulative weight loss of the zinc coated wireline samples at 125° F. after 4 hours of exposure to the two fluids. HCR-7000WL was also reported to be applied in the field at 1:2 dilution with water. CI-A was tested in 5% HCl to match the acid strength of the benchmark fluid. As shown from the data, HCl fluid inhibited by CI-A provided an excellent corrosion protection to the zinc coated wireline while the modified benchmark fluid, even at lower acid strength, failed completely to provide any corrosion protection.

A gentler cleaning method (as compared to cleaning method of Example 1) was applied to each zinc coated wireline sample for each fluid. After each test, each zinc coated wireline sample was left under running water for 10 seconds and then dried using a tissue. The stable weight was recorded thereafter. It is believed that this method is more practical as compared to the cleaning method of Example 1 and is more likely applied in the field.

Example 3—High Temperature Corrosion Testing

Figure 8B:
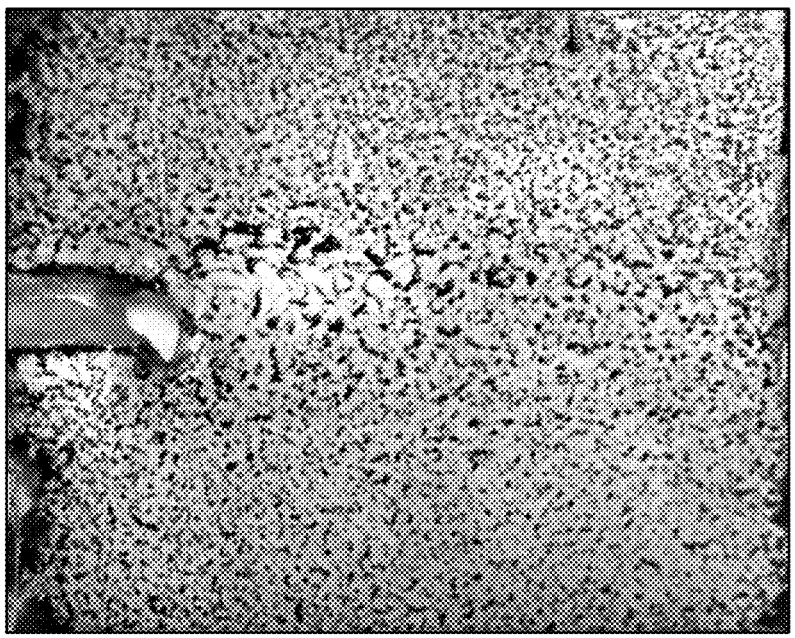
FIG. 8A and FIG. 8B are pictures of the zinc metal coupons after exposure to high temperature corrosion testing.
Figure 8A:
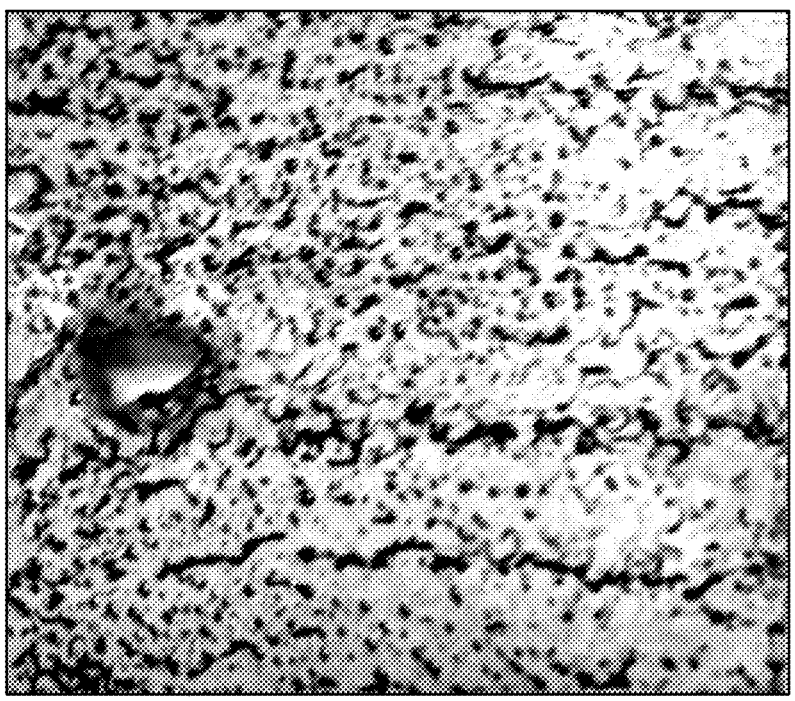

In this set of tests, zinc coupons with 99.99% zinc purity were used. The coupons measured 3 cm in length, 2.5 cm width, and 1 mm thickness. A 7.5% HCl fluid inhibited by 1.5% of CI-A was tested at 70° C. (160° F.) and 90° C. (194° F.), respectively for 4 hr. Data is listed in Table 5. As seen in the table, a very good zinc protection was still achieved even at higher temperature. Data is expressed as percentage of weight loss as well as the conventional industrial weight loss in pounds per square feet of the coupons. The standardized acceptable limit in the later unit is 0.05 lb/ft$^2$. FIG. 8A shows the coupons after the test conducted at 70° C. (about 160° F.), while FIG. 8B illustrates the coupons after the test conducted at 90° C. (about 194° F.). A brownish layer similar to what was observed in the previous example on the actual wire cable was also seen on the zinc coupons. Data indicates that the corrosion inhibitor composition described herein can be successfully applied at higher temperature and provides the necessarily protection to the zinc layer on the wire cable.

TABLE 5

| Temperature, ° C./° F. | Weight loss, % | Corrosion Rate, lb/ft$^2$ |
|---|---|---|
| 70/160 | 0.123 | 0.000903 |
| 90/194 | −0.02411 | −0.00017 |

Example 4—Ductility Test

Table 5 shows ductility and weight loss of respective zinc coated wireline samples following a long exposure to acid. Seven-inch zinc coated wireline samples were exposed to two fluids at 125° F. for 48 hrs: 1:2 diluted HCR-7000WL, and 5% HCl +1.0% CI-A.

A ductility test or a torture test is a standard wireline mechanical integrity test that involves wrapping and unwrapping test wire around another wire of the same diameter. The test wire is wrapped five times and unwrapped five times. A ductility score is assigned from 1 to 10 after counting each wrap and unwrap that the wire survives. For example, if a wire breaks on the fifth unwrap cycle, it receives a ductility score of 9 because it completed 5 wraps and 4 unwraps. If the score of the wire is less than 8, then the armor of the wire has lost too much ductility and is measure to be unreliable.

Ductility tests were repeated on two wires to ensure replicable results. The wireline samples exposed to the fluid inhibited by CI-A passed the full ductility testing with a score of 10, showing that the wireline samples retained mechanical strength. The wireline samples exposed to the benchmark industrial corrosion inhibitor product showed significant weight loss after acid exposure and failed the ductility test before the first wrap.

TABLE 6

| Fluid | Weight Loss (%) | Ductility Score |
|---|---|---|
| 1:2 diluted HCR-7000WL | 17.5 | 0 |
| 5% HCl + 1.0% CI-A | 0.4 | 10 |

Table 6: Ductility and weight loss of respective zinc coated wireline samples at 125° F.

Figure 9:
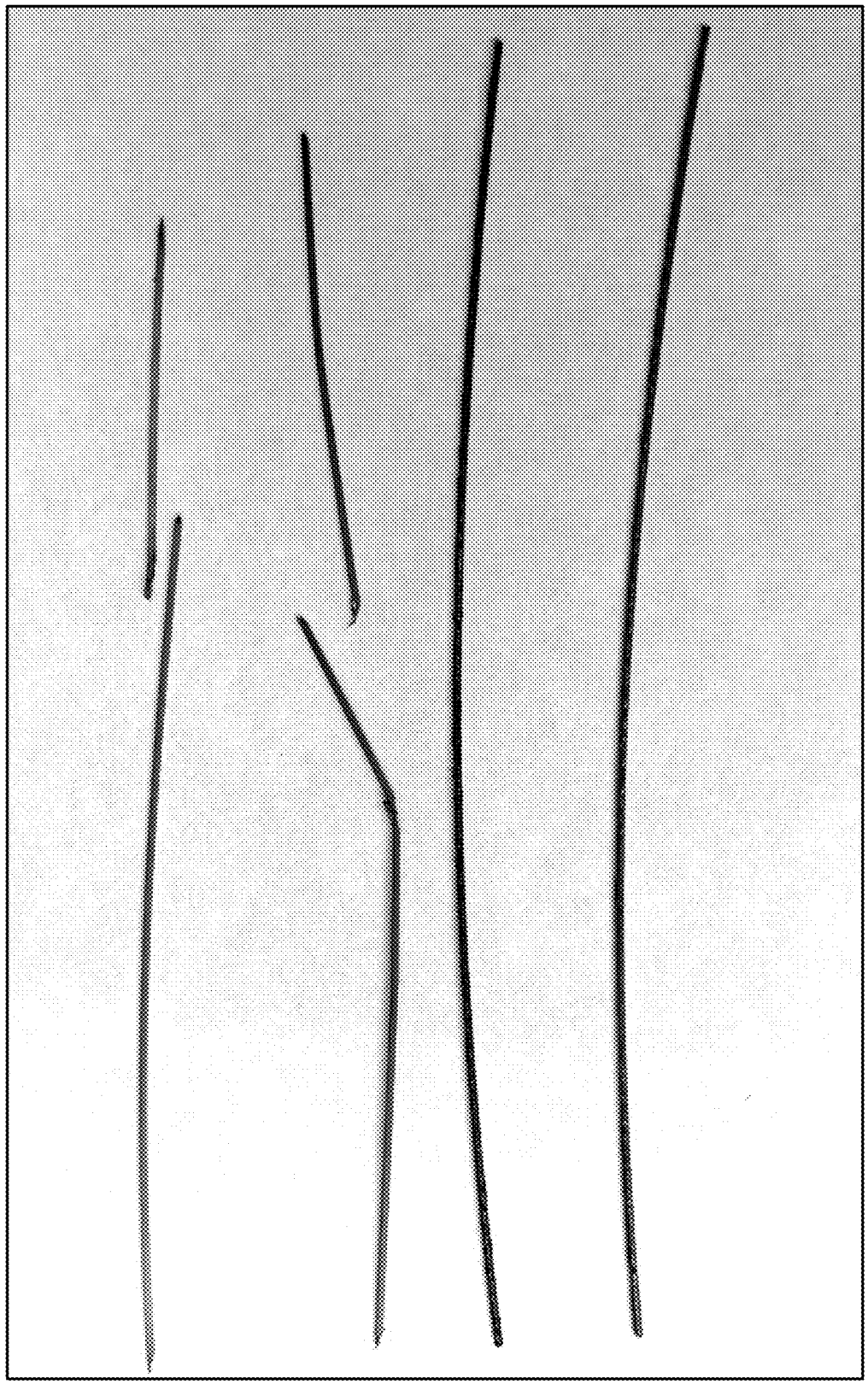
FIG. 9 illustrates pictures of zinc coated wireline samples after exposure for 48 hours.

FIG. 9 shows pictures of the zinc coated wireline samples after exposure to the acids. The top two wires in FIG. 9 are wireline sample exposed to the diluted benchmark fluid including the industrial corrosion inhibitor and the bottom two wires are wireline samples exposed to the fluid inhibited by CI-A.

Table 7 below shows the results of the ductility test.

TABLE 7

| Fluid | Ductility Test |
|---|---|
| 1:2 diluted HCR-7000WL | Wire broke |
| 1:2 diluted HCR-7000WL | Wire broke |
| 5% HCl + 1.0% CI-A | Wire did not break |
| 5% HCl + 1.0% CI-A | Wire did not break |

The embodiments of corrosion inhibitor compositions have been primarily described with reference to wellbore operations; the corrosion inhibitor compositions described herein may be used in applications other wellbore operations. In other embodiments, completion fluids and injected fluids including the corrosion inhibitor compositions according to the present disclosure may be used outside a wellbore or other downhole environment used for the exploration or production of natural resources. Accordingly, the terms "wellbore," "borehole," and the like should not be interpreted to limit tools, systems, assemblies, or methods of the present disclosure to any particular industry, field, or environment. In addition, the corrosion inhibitor compositions may be used in cased completion wellbores and in open hole completion wellbores.

One or more specific embodiments of the present disclosure are described herein. These described embodiments are examples of the presently disclosed techniques. Additionally, in an effort to provide a concise description of these embodiments, not all features of an actual embodiment may be described in the specification. It should be appreciated that in the development of any such actual implementation, as in any engineering or design project, numerous embodiment-specific decisions will be made to achieve the developers' specific goals, such as compliance with system-related and business-related constraints, which may vary from one embodiment to another. Moreover, it should be appreciated that such a development effort might be complex and time consuming, but would nevertheless be a routine undertaking of design, fabrication, and manufacture for those of ordinary skill having the benefit of this disclosure.

The articles "a," "an," and "the" are intended to mean that there are one or more of the elements in the preceding descriptions. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. For example, any element described in relation to an embodiment herein may be combinable with any element of any other embodiment described herein. Numbers, percentages, ratios, or other values stated herein are intended to include that value, and also other values that are "about" or "approximately" the stated value, as would be appreciated by one of ordinary skill in the art encompassed by embodiments of the present disclosure. A stated value should therefore be interpreted broadly enough to encompass values that are at least close enough to the stated value to perform a desired function or achieve a desired result. The stated values include at least the variation to be expected in a suitable manufacturing or production process, and may include values that are within 5%, within 1%, within 0.1%, or within 0.01% of a stated value.

As used herein, the terms "connect," "connection," "connected," "in connection with," and "connecting" are used to mean "in direct connection with" or "in connection with via one or more elements"; and the term "set" is used to mean "one element" or "more than one element." Further, the terms "couple," "coupling," "coupled," "coupled together," and "coupled with" are used to mean "directly coupled together" or "coupled together via one or more elements." As used herein, the terms "up" and "down," "uphole" and "downhole", "upper" and "lower," "top" and "bottom," and other like terms indicating relative positions to a given point or element are utilized to more clearly describe some elements. Commonly, these terms relate to a reference point as the surface from which drilling operations are initiated as being the top (e.g., uphole or upper) point and the total depth along the drilling axis being the lowest (e.g., downhole or lower) point, whether the well (e.g., wellbore, borehole) is vertical, horizontal or slanted relative to the surface.

A person having ordinary skill in the art should realize in view of the present disclosure that equivalent constructions do not depart from the spirit and scope of the present disclosure, and that various changes, substitutions, and alterations may be made to embodiments disclosed herein without departing from the spirit and scope of the present disclosure. Equivalent constructions, including functional "means-plus-function" clauses are intended to cover the structures described herein as performing the recited function, including both structural equivalents that operate in the same manner, and equivalent structures that provide the same function. It is the express intention of the applicant not to invoke means-plus-function or other functional claiming for any claim except for those in which the words 'means for' appear together with an associated function. Each addition, deletion, and modification to the embodiments that falls within the meaning and scope of the claims is to be embraced by the claims.

The terms "approximately," "about," and "substantially" as used herein represent an amount close to the stated amount that still performs a desired function or achieves a desired result. For example, the terms "approximately," "about," and "substantially" may refer to an amount that is within less than 5% of, within less than 1% of, within less than 0.1% of, and within less than 0.01% of a stated amount.

Further, it should be understood that any directions or reference frames in the preceding description are merely relative directions or movements. For example, any references to "up" and "down" or "above" or "below" are merely descriptive of the relative position or movement of the related elements.

The present disclosure may be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

The specific embodiments described above have been illustrated by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112 (f). However, for any claims containing elements designated in any other manner, it is intended that such elements are not to be interpreted under 35 U.S.C. 112 (f).

What is claimed is:

1. A method for operating a wellbore, the method comprising:
   placing a wireline including a perforating gun in a wellbore, the wellbore extending through an earth formation and including a casing extending through the earth formation, the wireline including zinc in a galvanized coating on an outer surface of the wireline;
   discharging the perforating gun to form perforations through the casing and in the earth formation surrounding the casing proximate the perforating gun;
   flowing a fracturing fluid including one or more proppants through the perforations and into the earth formation to open fractures in the earth formation with the one or more proppants;
   introducing a flushing fluid into the wellbore to displace the fracturing fluid;
   flowing a corrosion inhibitor composition into the wellbore and through the perforations before the fracturing fluid, the corrosion inhibitor composition comprising:
      an alkenylphenone; and
      a substituted 1-azanapthalene; and
   performing a fracturing operation on an additional wellbore neighboring the wellbore while the corrosion inhibitor composition is in the wellbore, the fracturing operation including:
      placing a wireline including a perforating gun in an additional wellbore neighboring the wellbore, the additional wellbore extending through the earth formation and including an additional casing extending through the earth formation, the wireline including zinc;

discharging the perforating gun to form additional perforations through the additional casing and in the earth formation surrounding the additional casing proximate the perforating gun;

flowing the fracturing fluid through the additional perforations and into the earth formation to open additional fractures in the earth formation with the one or more proppants;

introducing the flushing fluid into the additional wellbore to displace the fracturing fluid; and flowing the corrosion inhibitor composition into the additional wellbore and through the additional perforations therein before the flowing the fracturing fluid through the additional perforations.

2. The method of claim 1, wherein discharging the perforating gun to form the perforations includes forming the perforations through cement surrounding the casing.

3. The method of claim 1, further comprising flowing an acid into the wellbore after forming the perforations through the casing and in the earth formation, the acid including the corrosion inhibitor composition.

4. The method of claim 1, wherein flowing the corrosion inhibitor composition into the wellbore includes flowing the corrosion inhibitor composition into the wellbore while the wireline is in the wellbore.

5. The method of claim 1, wherein flowing the corrosion inhibitor composition into the wellbore includes contacting surface equipment with the corrosion inhibitor composition.

6. The method of claim 5, further comprising removing the perforating gun from the wellbore prior to flowing the fracturing fluid through the perforations.

7. The method of claim 1, wherein:
the alkenylphenone includes the following structure:

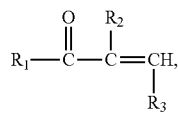

wherein $R_1$ is an unsubstituted or an inertly substituted aryl having 6 carbon atoms to 10 carbon atoms, and $R_2$ and $R_3$ individually include hydrogen, a halogen, an inertly substituted aliphatic of 3 carbon atoms to 12 carbon atoms, or an unsubstituted or an inertly substituted aryl having 6 carbon atoms to 10 carbon atoms; and the substituted 1-azanaphthalene has the following structure:

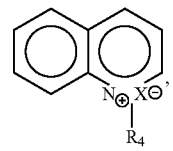

wherein $R_4$ is a substituted alkyl having 4 carbon atoms to 16 carbon atoms, or an unsubstituted or inertly substituted alkylaryl having 7 carbon atoms to 20 carbon atoms, and X is a halide.

8. The method of claim 1, wherein the corrosion inhibitor composition comprises at least about 3.0 parts by weight of the substituted 1-azanaphthalene for every about 1.0 part by weight of the alkenylphenone.

9. The method of claim 1, wherein the corrosion inhibitor composition comprises a cetyl trimethyl ammonium bromide.

10. The method of claim 1, wherein the corrosion inhibitor composition includes from about 2.0 parts by weight to about 5.0 parts by weight of the substituted 1-azanaphthalene for every about 1.0 part by weight of the alkenylphenone.

* * * * *